Figure 1:

No. 702,738.   Patented June 17, 1902.
M. MONTGOMERY.
FLEXIBLE HOSE ADAPTED FOR COUPLINGS, &c.
(Application filed Aug. 13, 1901.)

(No Model.)

Witnesses:
Louis D. Heinrichs
P. M. Kelly

Inventor
Marshall Montgomery
By
Atty

THE NORRIS PETERS CO., PHOTO-LITHO., WASHINGTON, D. C.

UNITED STATES PATENT OFFICE.

MARSHALL MONTGOMERY, OF PHILADELPHIA, PENNSYLVANIA.

FLEXIBLE HOSE ADAPTED FOR COUPLINGS, &c.

SPECIFICATION forming part of Letters Patent No. 702,738, dated June 17, 1902.

Application filed August 13, 1901. Serial No. 71,916. (No model.)

*To all whom it may concern:*

Be it known that I, MARSHALL MONTGOMERY, of the city and county of Philadelphia, Pennsylvania, have invented an Improvement in Flexible Hose Adapted for Couplings, &c., of which the following is a specification.

My invention has reference to flexible hose adapted for couplings, &c.; and it consists of certain improvements fully set forth in the following specification, and shown in the accompanying drawings, which form a part thereof.

The object of my invention is to provide a construction of hose especially adapted for use as a universal coupling-joint between pipe-sections of large dredging apparatus in which the pipes are supported upon pontoons and connected by the flexible couplings. In this class of work the pipes and couplings must be capable of withstanding great strains or pressure due to the water within the pipes, as well as stones and heavy material which are driven through them, and which would cause ordinary rubber coupling-tubes to swell out or become ruptured. Couplings between the metal pipes so supported on pontoons must also have great flexibility and compressibility, because the ends of the pipes are constantly shifting vertically, laterally, and also to and from each other. Light coils of wire within the rubber coupling-tubes will not suffice for strength, and would be bent and distorted, and heavy rods coiled and embedded in the rubber, while giving strength, would not have the flexibility and yielding qualities required and would cut and destroy the more delicate rubber of the tube under the great motions and strains due to the hard usage to which it is subjected.

My object is to provide a form of flexible coupling which shall secure the requirements of strength, coupled with the essential requisites of flexibility and yielding qualities to avoid bulging, distortion, and bursting, on the one hand, and permitting compression, with flexibility and freedom of movement without danger of injury to the metal coil or rubber tube, on the other hand.

In carrying out my invention I provide the rubber tubing with a metallic coil of flexible wire or cable embedded within the body of the rubber and preferably nearer to the outer surface than to the inner surface. In this manner the soft qualities of the rubber tube are not destroyed or interfered with because the metal coil is of flexible cable which has great strength against stretching and hence protects the rubber tube against bulging under heavy loads or pressure, and has also great flexibility and hence allows the tube to be twisted, collapsed, or even doubled upon itself without injury to the coupling. Where the tubing is to be employed as a coupling between pipes in dredging apparatus or for other purposes, I prefer to arrange the metallic coil so that it terminates at a considerable distance from each end of the tube-section to make the end portions better adapted to be clamped upon the end of the said tubes and avoid the possibility of the metal of the coil cutting through the rubber under the compression of the clamp.

My invention will be better understood by reference to the drawings, in which—

Figure 2:
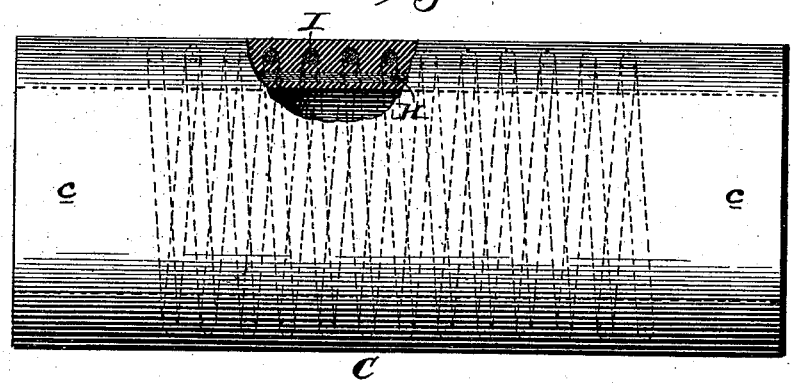
Figure 3:
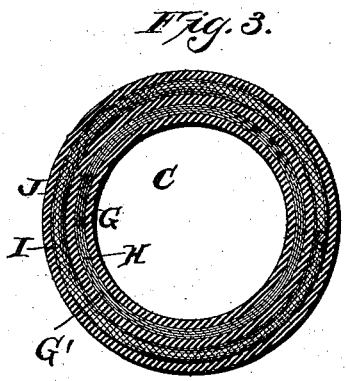
Figure 4:
Figure 5:
Figure 6:
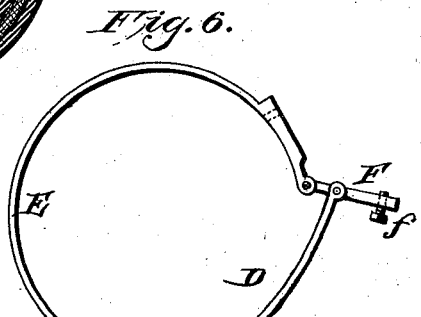

Figure 1 is an elevation showing a dredging pipe-line embodying my improvement. Fig. 2 is an elevation, with part in section, of a coupling-tube embodying my invention. Fig. 3 is a cross-section of same. Fig. 4 is an elevation of portions of the flexible wire cable and textile covering used as the coil in the coupling; and Fig. 5 is an elevation of a form of clamp adapted for clamping my improved rubber tubing or hose upon the end of a pipe.

A represents pontoons which support the iron pipes B. The pipes B on the several pontoons are coupled by rubber-hose coupling-sections C, clamped at the ends of the pipes by the clamps D. In this manner the iron pipes are flexibly connected and compensate for the motions of the pontoons. In practice it is frequently necessary that these couplings C should be twenty inches or more in diameter; and it is evident that when rubber tubing is made of this size it is not sufficiently strong against expansion. When solid wire is coiled about or within the rubber of the tube to strengthen it, it soon destroys itself and also the rubber, and, moreover, does not give the flexibility required to compensate for the shifting of the pipe ends under the rocking of the pontoons.

In making my improved rubber tubing adapted for couplings I form the tube C of rubber G of short length, with one or more layers of cloth or textile material H, in the customary manner. Outside of this cloth is preferably a second layer of rubber, and upon this is placed a metallic coil of flexible wire cable I. Over this coil of wire is placed an outer layer of rubber J, and all of said parts are vulcanized together so as to form one concrete body with the metallic flexible coil wholly embedded within the rubber, thereby not only preventing the undesirable expansion of the tube, but also permitting the coupling to have the greatest flexibility and compressibility without injury to the coil or to the rubber. To further strengthen the construction, I may coat the flexible wire cable of the coil I with textile material, as indicated at i in Fig. 4, said textile material being braided or wrapped about the cable. This textile material covering to the cable may be saturated with a rubber compound adapted to be vulcanized, and thereby firmly attached to the rubber coatings G' and J. In this manner a textile spiral tube is formed incasing the metallic flexible coil, thus preventing any possibility of the coil cutting through or destroying the rubber under any severe action. Where the tubing is intended specifically to be used for coupling two pipes together, as shown in Fig. 1, it is desirable that the flexible metallic coil I shall terminate at a considerable distance from each end of the rubber tube-section, as indicated in dotted lines in Fig. 2, so as to leave only the rubber to be clamped by clamps D. As shown, these clamps consist of a band of iron E, the two ends of which are connected to a lever F at slightly-separated places, and said lever is adapted to be drawn over and screwed down in position by a screw f, thereby producing great circumferential clamping action upon the rubber tube. Any other suitable form of clamp may be employed in place of that shown. The internal construction of the rubber tube may be varied, if so desired. Therefore I do not limit myself to the use of the textile material H, although I deem the same preferable.

By making the metallic coil of a flexible cable or twisted wire strands, as shown, great strength is secured without impairing the flexibility or elasticity of the hose as an entirety, and this is especially advantageous in the case of large coupling-sections.

The pipe-coupling constructed as above set out has the rubber strengthened by a freely-flexible metallic coil yieldable in all directions without material resistance. By the term "freely flexible," I mean to distinguish my coil from the usual form of solid wire coil, which is not capable of being collapsed or bent into shapes other than circular without becoming set and injured.

My coil is further distinguished by being yieldable in all directions without material resistance, because the coils may be flattened under normal action and at once reassume their former circular shape without injury, whereas in prior solid wire coils there is no yieldability in any direction which will permit the coil to assume other than a circular shape in cross-section.

My invention comprehends any metallic coil of such yielding and flexible character that it may without injury be bent and caused to assume any shape desired, so that the rubber tube may be bent or flattened freely without injury to the coil.

While I prefer the construction shown, I do not limit myself to the minor details, as these may be modified in various ways without departing from my invention.

Having now described my invention, what I claim as new, and desire to secure by Letters Patent, is—

1. A pipe-coupling consisting of a rubber tube combined with a freely-flexible metallic coil yieldable in all directions without material resistance and embedded within the rubber walls of the tube so as to be wholly covered, the said coil permitting the tube to collapse when necessary without injury to said tube or itself.

2. A rubber-tube coupling combined with a spiral textile tube encircling the rubber tube and wholly embedded within the rubber of the tube and also terminating at a considerable distance from each end thereof, and a flexible metallic cable inclosed within the spiral textile tube and thereby held out of contact with the rubber of the tube and leaving the ends of the rubber tube without metal.

3. A pipe-coupling consisting of a rubber tube combined with a metallic coil of twisted wires coiled into a helix and wholly embedded in the walls of the rubber tube.

In testimony of which invention I hereunto set my hand.

MARSHALL MONTGOMERY.

Witnesses:
R. M. HUNTER,
J. W. KENWORTHY.